United States Patent [19]

McCoy et al.

[11] Patent Number: 4,587,783

[45] Date of Patent: May 13, 1986

[54] PANEL JOINING METHOD APPARATUS

[75] Inventors: Patrick A. McCoy; Roy J. Reese, both of Tulsa, Okla.

[73] Assignee: Nordam, Tulsa, Okla.

[21] Appl. No.: 641,271

[22] Filed: Aug. 16, 1984

[51] Int. Cl.[4] .............................................. E04B 1/00
[52] U.S. Cl. ...................... 52/282; 52/270; 52/586
[58] Field of Search ................... 52/90, 262, 264, 265, 52/268, 269, 270, 281, 284, 285, 286, 586, 582, 712, 715, 288, 475, 656, 657, 278, 228, 229–595

[56] References Cited

U.S. PATENT DOCUMENTS

| | | | |
|---|---|---|---|
| 2,158,132 | 5/1939 | Shannon | 52/586 X |
| 3,867,048 | 2/1975 | Endzweig | 52/656 X |
| 3,919,818 | 11/1975 | Kato | 52/270 X |
| 4,437,278 | 3/1984 | Thomas, Jr. | 52/288 X |

FOREIGN PATENT DOCUMENTS 2300770  7/1973  Fed. Rep. of Germany ........ 52/285

*Primary Examiner*—Carl D. Friedman
*Assistant Examiner*—Creighton Smith
*Attorney, Agent, or Firm*—Head, Johnson & Stevenson

[57] ABSTRACT

Apparatus for use in joining panel A to panel B to form a corner joint in which panel B has a recess cut in the edge to be joined, the apparatus being in the form of an elongated structural reinforcing and joining member configured in cross-section by a thin rectangular base portion having an inner surface bonded to one surface of panel A, the cross-sectional configuration including an end portion integrally extending from one edge of the base portion and perpendicular the base portion, the inner surface being bonded to an edge of panel A and the cross-sectional configuration being further defined by an integral T portion extending from the base portion in a plane parallel the plane of the end portion, the thickness of the T portion being slightly less than the width of the groove formed in the edge of panel B, the T portion being bonded to the groove in panel B.

4 Claims, 7 Drawing Figures

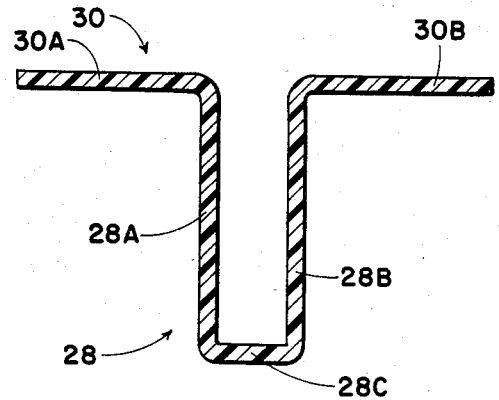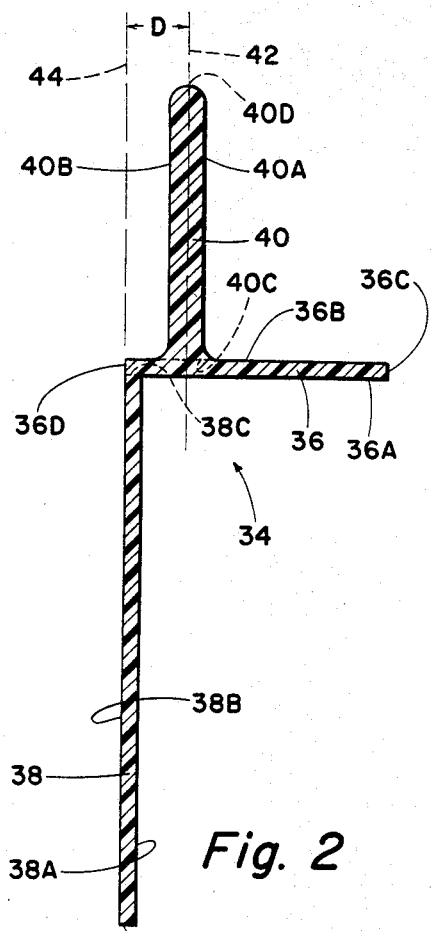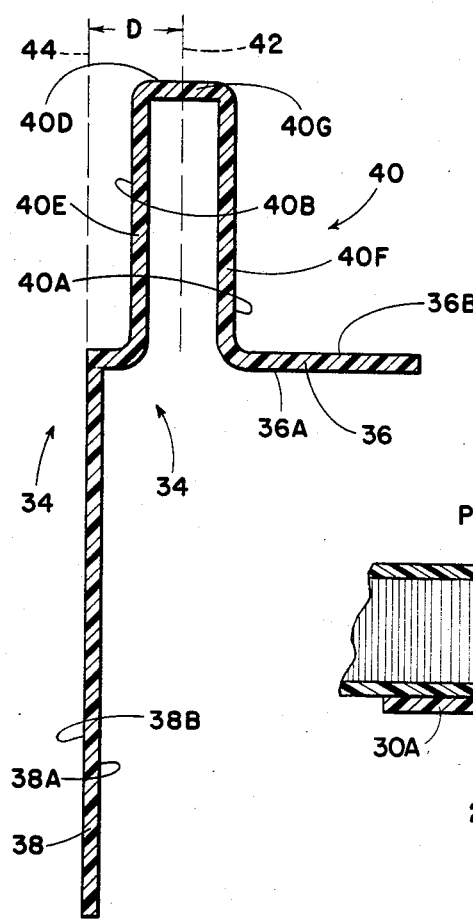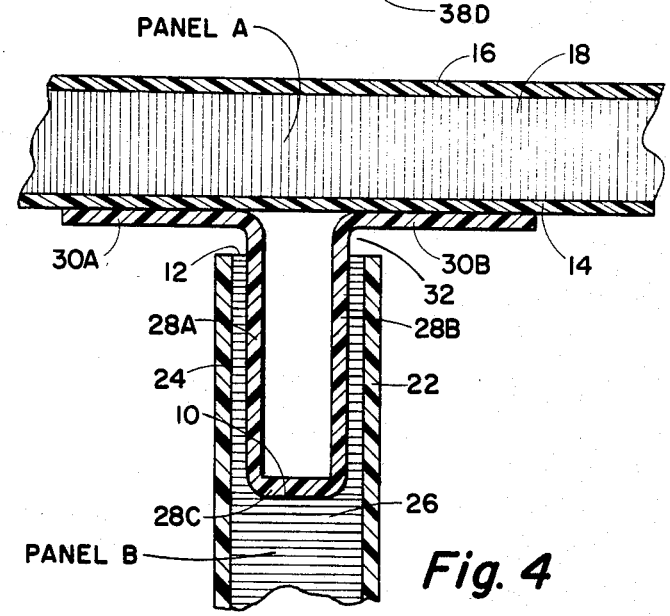

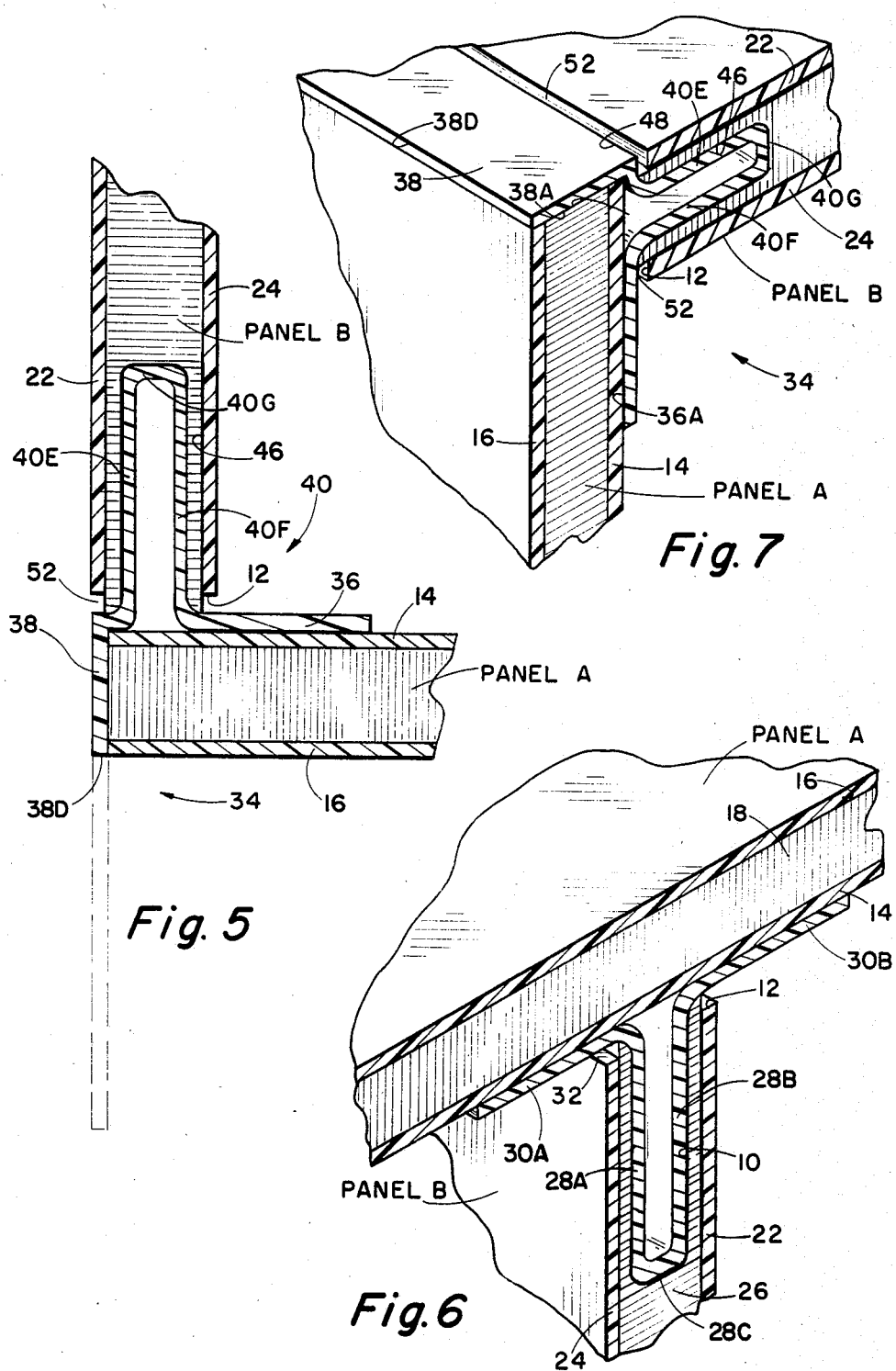

PANEL JOINING METHOD APPARATUS

BRIEF SUMMARY OF THE INVENTION

A modern technique for manufacturing items made of panels employs the use of light-weight, honeycomb type panels. These panels typically include opposed sheets forming the top and bottom surfaces, the sheets being joined by a honeycomb core material. Such honeycombed panels are not successfully joined in the typical manner of joining products made of wood or other solid type construction. The honeycomb filler used in panels adds rigidity and strength to the panels but is not susceptible to receiving screws, nails or the like by which panels are typically joined together.

Structures made of honeycomb panels can be bonded to each other but such joints are not sufficiently strong in themselves without other types of structural reinforcing to be successfully employed particularly where high strength and light weight are required such as in aircraft panels and the like.

Others have devised systems employing T shaped structural members formed of non-metallic material with the stem of the T being received in a groove in the edge of a panel to be joined to form a T joint. The T shaped structural material of the prior used systems has been of cellular type plastic material having a reinforcing fiberglass cloth bonded to the exterior surfaces. While such system works satisfactorily providing such fiberglass reinforced solid core T shaped structural members it is fairly expensive and further, the members have to be relatively thick and all cross-sectional portions to provide the required structural strength.

The present invention provides a means of joining panels to make both corner and T joints using two basic types of structural reinforcing and joining members. When a T joint is to be formed wherein one edge of a panel B is to be joined to one surface of a panel A at a place displaced from an edge of panel A, a T shaped type structural member is employed. This T shaped structural member is formed of a material, such as plastic, fiberglass or the like, which, in cross-section, is of uniform thickness throughout. The material is configured such that the stem of the T is hollow and formed by paralleled walls closed at the ends, each wall connecting with a portion of the cross bar of the T. The cross bar portion is bonded to one surface of panel A and the stem portion of the T shaped structural member is bonded in the groove formed in the edge of panel B.

In the other structural device an elongated member is provided which in cross-section includes three basic portions. The first is a base portion which is bonded to one surface of a panel A adjacent the edge of panel A. The second portion is an end portion which intersects the base portion perpendicularly thereto and which is bonded to the edge of panel A. The third portion is a T shaped portion which is received in the groove in panel B, the plane of the T shaped portion being displaced from the plane of the end portion.

As previously indicated, the structural members for use in forming joints of honeycombed panels are made of relatively thin material, such as plastic or fiberglass. These structural members may be extruded of metal however in most applications wherein honeycomb panels are to be joined metal is undesireable because of the additional weight employed.

DESCRIPTION OF THE DRAWINGS

FIG. 1 is a cross-sectional view of a structural member as may be employed in practicing the principles of this invention for forming a T joint.

FIG. 2 is a cross-sectional view of an elongated structural member for forming corner T joint showing an embodiment of the invention wherein the thickness of at least one of the panels is about ¼ inch.

FIG. 3 is an alternate embodiment of the structural member of FIG. 2 wherein the thickness of one of the panels is greater than ¼ inch.

FIG. 4 is a cross-sectional view of panels joined in a T-joint employing the structure of FIG. 1.

FIG. 5 is a cross-sectional view of panels joined in an end joint employing the structure of FIG. 3.

FIG. 6 is an isometric view showing the formation of a T joint wherein panels A and B are joined together employing the structural member of FIG. 1.

FIG. 7 is an isometric view showing the joining of honeycomb panels to form a corner joint employing the structural member of FIG. 3.

DETAILED DESCRIPTION OF THE PREFERRED EMBODIMENT

Referring to the drawings and first to FIG. 1 the apparatus of this invention is shown as used to form a T joint. FIGS. 4 and 6 illustrate the application of the apparatus of FIG. 1. The device is shown and will be illustrated and described as it is employed for forming a T joint between a panel A and a panel B in which panel B intersects panel A perpendicularly and at a point intermediate the ends of panel A. Panel B has a recess 10 formed in one edge 12. Panels A and B are of the type generally known as honeycomb panels, that is wherein each panel includes opposed surface sheets of substantially rigid material with honeycomb filler material. For instance, panel A includes a first sheet 14 and a second sheet 16 with a honeycomb core 18 between and bonded to the sheets 14 and 16. The core 18 may be of a wide variety of constructions but the expression "honeycomb" is generic to any type core which is intended to provide strength and rigidity at a minimum weight. In like manner the panel B is formed of first and second outer sheets 22 and 24 with honeycomb core 26 therebetween. The groove 10 formed in edge 12 of panel B preferably is of a width equal to the spacing between the interior surfaces of sheets 22 and 24.

To form a T joint between panels A and B using current technology is somewhat difficult in that the honeycomb cores 18 and 26 do not readily retain nails, screws or other common attachment devices.

The attachment mechanism of FIG. 1 consists of an elongated member of length preferably that equal to the length of the edge of the panel to be joined, however if the panel is of unusually long length a succession of lengths of the structural members may be used in series. The structural member for forming a T joint is shown in cross-section in FIG. 1. In cross-section the structural member includes a base portion 28 and an integral bar portion 30. The width of the base portion 28 is that which is substantially equal to the width of the groove formed in panel B which, as previously indicated is preferably measured between the inner surfaces of the opposed exterior sheets 22 and 24 so that the groove 10 when formed in the panel will expose the interior surfaces of the exterior sheets.

The T base portion, generally indicated by the numeral 28, is formed of integral opposed parallel leg portions 28A and 28B. The leg portions are joined by the integral end portion 28C. The bar portion of the structural member is generally by the numeral 30 and includes portions 30A and 30B.

A T joint, shown isometrically in FIG. 6, is formed by first applying a bonding material to the surfaces of portions 30A and 30B of the structural member of FIG. 1. The structural member is then pressed firmly against the surface of panel A to bond it to the surface. Panel B, having the groove 10 formed therein, can then be positioned on the T base portions 28A and 28B. The panel B may be inserted into position to make sure of the fit desired and then it can be removed from engagement with the structural member and bonding material applied to groove 10 or to the exterior surfaces of the structural member portions 28A, 28B and 28C. The sheet B may then be positioned so that it is bonded to the base portion 28. To allow for adjustment, some gap indicated by the numeral 32, may be retained between the edge 12 of panel B and the lower surfaces of the bar portions 30A and 30B and the gap 32 filled in later with caulking material.

Referring now to FIGS. 2, 3, 5 and 7, an embodiment of the invention for use in forming a corner joint is shown. The structural device for joining together two panels to form a corner joint is shown in FIG. 2 of the type wherein a first panel is relatively thin, such as about ¼ inch thick. The device of FIG. 3 is the type which is employed when the panel is of thickness of about ⅜ inch and greater. Referring first to FIG. 2 the corner structural member is generally indicated by the numeral 34 and consists of three basic portions. First is a thin rectangular base portion 36 having a planar inner surface 36A and outer surface 36B. The base portion 36 further has opposed parallel edges 36C and 36D.

The second basic integral portion as revealed in the cross-sectional view of FIG. 2 of the structural member is an end portion 38 having an inner surface 38A, an outer surface 38B, an inner end 38C and an outer end 38D. The inner edge 38C is coincident with the base portion edge 36D. The plane of end portion 38 is perpendicular the plane of the base portion 36.

The third portion of the structural member of FIG. 2 as revealed in its cross-sectional arrangement, is an integral T portion 40 which extends from the base portion 36 and perpendicular to it. The T portion has an inner surface 40A and an outer surface 40B, an inner end 40C which is imaginary in that it is coincident with the base portion outer surface 36B, and an outer end 40D. The plane 42 of the T portion 40 is parallel to the plane 44 of the end portion outer edge 38B and is spaced from it a distance D which is equal to one-half of the thickness of the panel B as seen in FIG. 7, the plane D being taken intermediate the inner and outer surface 40A and 40B.

FIG. 3 shows an alternate arrangement of the corner structural member 34 in which the T portion 40 is formed of parallel legs 40E and 40F, the legs being closed by an integral end portion 40G. In this arrangement the entire structure is formed of a member which is of substantially uniform thickness, and can be manufactured such as by an extrusion process, or by other methods for forming elongated structural members of metallic or non-metallic material, with non-metallic material being preferred as previously indicated.

FIG. 5 shows the method of use of the corner structural member 34. Panel B has a groove 46 in edge 48 in the same manner as the panel B in FIG. 4. The member T portion 40 represented by legs 40E and 40F and end portion 40G are received and bonded in groove 46. The inner surface 36A of the base portion is bonded to panel A first sheet 14 and the end portion inner surface 38A is bonded to the edge 50 of panel A. In assembling the corner structure of FIG. 5 to join panel A and panel B the structural member 34 is first bonded to panel A. Panel B may be assembled onto the T portion 40 to insure that it is properly dimensioned for the required construction. If the dimension is proper, adhesive or other bonding material is applied to the groove 46 formed in panel B and it is inserted on the T portion 40. To allow for adjustment the edge 12 of panel B may not abut contiguously to the structural member base portion outer surface 36B but may leave a gap 52. The gap 52 may be filled with a caulking material to complete the joint.

The structural members as represented in the cross-sectional views of FIGS. 1, 2 and 3 provide devices which can be employed for joining at a T joint or corner joint the panels of various thicknesses and in a manner so that the joint is exceedingly strong and of light weight. For adaptability to various thicknesses of panel A for the corner joint using the structure 34 the end portion 38 may be longer than is normally anticipated to be the thickness of panel A. After the panel has been joined the extra portion may be cut off so that the outer end 38D may then coincide with the plane of panel A second sheet 16.

In the typical application of the invention for joining honeycomb panels of ¼ to 1 inch in thickness the material of which the structures 28 and 34 are constructed may be of about 1/32 inch thick. Referring to FIG. 1 the length of the total base portion including portion 30A and 30B may be approximately 9/10 inch while the length of the T portion 28 may be of approximately ⅜ inch.

With reference to FIGS. 2 and 3, the structural member 34 for forming a corner joint may utilize material of approximately 1/32 inch in thickness, the length of the T section 40 may be approximately ⅜ inch and the length of the base portion 36 may be approximately 7/10 inch. By making the length of the end portion 38 somewhat greater than 1 inch, any panel having a thickness of ¼ inch to 1 inch may be employed. Thus the device of FIGS. 2 and 3 is typically more critical for the thickness of panel B than for panel A since a variety of thicknesses of panel A may be employed merely by cutting off the excess part of the end portion 38.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for use in joining panel A to panel B to form a corner joint, each panel being of selected thickness between opposed panel surfaces and having edges therearound, panel B having a recess of selected width cut in the edge to be joined, the recess being intermediate the opposed panel surfaces, the apparatus comprising:

an elongated structural reinforcing and joining member configured in cross-section by a thin, rectangular base portion having planar inner and outer surfaces, the inner surface being adaptable to be bonded to one surface of panel A, and having opposed paralleled edges;

an end portion integrally extending from one edge of said base portion and perpendicular to said base portion inner surface, the end portion having an inner and outer planar surface and having opposed paralleled edges, the first of such edges being in coincidence with one edge at said base portion, the inner surface adaptable to being bonded to an edge of panel A, the second edge being spaced from said base portion inner surface a distance substantial the thickness of said panel A; and an integral T portion extending from said base portion outer surface and in a plane parallel the plane of said end portion, the thickness of the T portion being less than the thickness of panel B and slightly less than the width of said recess formed in the edge of panel B, the plane of said T portion drawn intermediate its thickness being offset from the plane of the outer surface of said end portion by an amount equal about ½ of the thickness of panel B.

2. Apparatus for use in joining panel A to panel B to form a corner joint according to claim 1 wherein the apparatus is formed of material of substantially the same thickness in all cross-sectional parts and wherein said integral T portion is of U-shaped cross-sectional configuration having integral opposed parallel leg portions and wherein said base portion is interrupted by the space between said leg portions of said U-shaped T portion.

3. Apparatus for use in joining panel A to panel B to form a corner joint according to claim 1 wherein said end portion is of length at least as great as the thickness of panel A, whereby any excess of length of said end portion greater than the thickness of panel A may be trimmed to match the thickness of panel A.

4. An apparatus for use in joining panel A to panel B to form a T joint, each panel being of selected thickness between opposed panel surface and having edges therearound, panel B having a recess in one edge, and in which the plane of panel B perpendicularly intersects the plane of panel A, comprising:

an elongated structural reinforcing and joining member configured in cross-section of material of relatively thin and uniform thickness by:

a U-shaped T portion having integral opposed, parallel leg portions and an integral end portion closing one edge of both opposed leg portions, the leg portions having inner surfaces facing each other and outer surfaces, the outer surfaces of said leg portions being spaced apart a width slightly less than the width of the recess in panel B and the T portion being adaptable to be received and bonded in said recess in said panel B; and opposed co-planar base portions integrally extending from said T portion leg portions, the base portions extending in opposite directions and being in a plane perpendicular the plane of said T portion, the base portions being adapted to bonding to a planar surface of panel A.

* * * * *